Patented Feb. 15, 1944

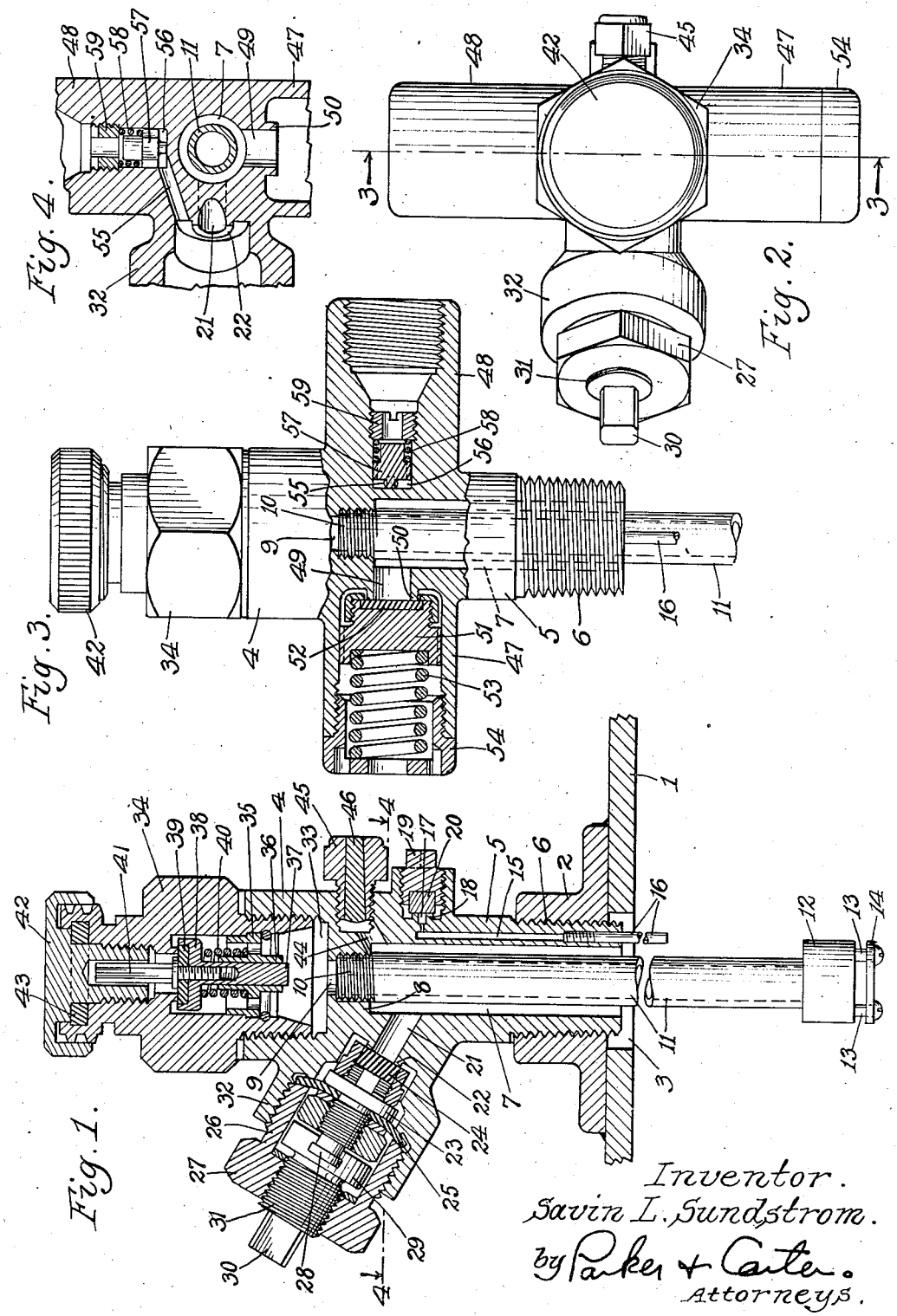

2,341,579

UNITED STATES PATENT OFFICE 2,341,579

VALVE ASSEMBLY

Savin L. Sundstrom, Chicago, Ill., assignor to The Bastian-Blessing Company, Chicago, Ill., a corporation of Illinois Application August 21, 1939, Serial No. 291,177

25 Claims. (Cl. 62—1)

This invention relates to a valve and, primarily, to a valve assembly intended for use in connection with a tank or storage container in which liquid is stored. One of its most common uses is in connection with such a tank in which liquid is stored under pressure. This liquid may, for example, be a liquefied hydro-carbon, although the invention is not limited to that use. One object is to provide in a single assembly a filler, a service valve, a pressure release or safety valve, and fusible means. Another object is to provide in connection with a valve assembly of the type indicated means so arranged that upon the occurrence of sufficient heat to cause the fusible element to yield, the system will remain open thereafter, irrespective of subsequent cooling. Another object is to provide in such an assembly means for adequate filling and means whereby a maximum fluid capacity for a given total size of mechanism is achieved.

Other objects will appear from time to time throughout the specification and the claims.

The invention is illustrated more or less diagrammatically in the accompanying drawing, wherein:

Figure 1 is a longitudinal cross section of one form of the invention;

Figure 2 is a plan view;

Figure 3 is a longitudinal section taken at line 3—3 of Figure 2;

Figure 4 is a transverse cross section taken at line 4—4 of Figure 1.

Like parts are designated by like characters throughout the specification and the drawing.

As shown, the invention may be applied to the wall or cover of a tank or container which is indicated at 1. A suitable hollow interiorly threaded member 2 is secured to the tank wall about the perforation 3. The valve body includes a hollow, generally rounded section 4 which is somewhat reduced as at 5 and threaded as at 6. The section 5, 6 has a generally cylindrical bore 7 which terminates at a partition member 8, perforated as at 9 and interiorly threaded to receive the correspondingly threaded end 10 of a pipe 11. At its bottom the pipe 11 carries a fitting 12 from which two valve retaining members 13 depend, and loosely positioned upon them is a flap valve 14. This valve serves as a spreader in the normal filling operation. Liquid flowing down through the pipe 11 contacts the valve 14 and is spread laterally by it. Should anything happen to cause an upward flow of fluid through the pipe 11, if this flow obtains sufficient velocity or volume, the valve member 14 will move upwardly along the members 13 and will close the lower end of the pipe 11, preventing further outward flow. The member 5, 6 is, also, perforated or bored as at 15 and is threaded at its lower end to receive a correspondingly threaded end of a pipe 16. This pipe depends downwardly in the same direction as the filler pipe 11 but is shorter than the latter so that its lower end is above the lower end of the pipe 11. In one typical installation, the pipe 11 extends downwardly below the valve housing a distance of twelve inches, and the pipe 16 extends downwardly only ten inches, its lower end being, thus, two inches above the lower end of the pipe 11.

Communicating with the bore 15 is a bore 17 which terminates in a seat 18. A valve plug 19 is threaded in a suitably threaded enlargement of the bore 17 and may carry a sealing member 20. The plug 19 may be moved to open and close the passage. It is mainly used in filling the tank, as will be described below.

Communicating with the bore 7 at a point outside of the pipe 11 is a passage 21. A seat 22 is formed at the outer end of this passage, and a valve member 23, having a sealing portion 24, may be moved to open and close the passage 21. In the particular form shown, the valve 23 passes through and is engaged with a diaphragm 25, the edges of which are held in place by a gland 26; the outer end of which is hexagonal as shown at 27 to permit its ready rotation. The outer end of the valve 23 has a headed stud 28 formed upon it which may be engaged by a flange 29 formed on the operating member 30, which member is threaded as at 31. Rotation of the member 30, 31 with respect to the member 26 moves it in and out and, thus, opens or closes the valve 23, raising it from or returning it to the seat 22. The general valve housing of the total installation is provided with a hollow enlargement 32 in which the parts just last described are positioned.

The perforation 9 in the partition-like member 8 communicates with a space 33 formed in the section 4 of the general housing. Seated in suitable threads in the space 33 is a supporting member 34 which may be hexagonal, as shown in Figure 2. Positioned within this member is a spider 35 in which is formed a socket member 36. Slidably mounted in the member 36 is a stem 37 having an enlargement 38 within which is positioned a sealing portion 39. A spring 40 is positioned about the member 36 and bears at one end upon it and at the other upon the enlargement 38, tending, when free to do so, to seat the valve, as shown in Figure 1. An operating stem 41 extends upwardly from the valve stem 37 and, in the form here shown, is threadedly engaged with it. A cover member 42 is threaded upon the upper end of the member 34 and may be provided, as shown, with a hollow, inwardly extending enlargement which fits about the stem 41. Packing 43 may be used, if desired, to prevent leakage past the cover member 42.

Leading from the bore 7 is a passage 44 which communicates with the exterior of the housing. It is suitably threaded to receive a correspondingly threaded plug 45 which is hollow and receives a fusible portion 46. When the latter is unfused, no fluid escapes. When the latter fuses, an opening is produced into the housing.

As shown particularly in Figures 2 and 3, the valve housing generally has two further extensions—the extension 47, which is hollow and houses a pressure release or safety valve; and the extension 48, which is hollow and houses an excess flow check valve and receives a conduit or pipe through which gas or other fluid passes in the course of use. From the space 7 a passage 49 leads into the member 47. It may be surrounded by a valve seat 50. A valve member 51 is normally seated upon the seat 50 and may have a suitable sealing material 52 upon it. The member 51 is given some shape other than round. It may be hexagonal or have grooves cut in it. The purpose of this shape is to permit escape past it once it has been raised from the valve seat 50. A spring 53, which bears at one end upon the valve 51 and at the other upon a perforated retainer 54, normally holds the valve seated. Upon the occurrence of sufficient pressure, it yields to permit unseating and, then, fluid escapes through the passage 49, past the valve member 51 and out through the perforations of the retainer 54.

A passage or conduit 55 is bored in the housing and it leads from the space between the valve seat 22 and the diaphragm 25 to the space 56 which is formed within the enlargement 48 and within which an excess flow check valve 57 is mounted. This valve is hexagonal or otherwise shaped to permit fluid to pass it and is normally held open by a spring 58 which bears at one end against it and at the other against a perforated spring retainer 59. The valve 57 is so shaped that fluid can normally pass it. If the flow of fluid past the valve 57 is too rapid or in too great a quantity, the valve will be moved against the resistance of the spring 58 and seated against the retainer 59 to stop further flow. The enlargement 48 is interiorly threaded at its outer end to receive a discharge or service conduit or pipe.

It will be realized that whereas I have described and illustrated a practical and operative method and device, nevertheless, many changes may be made in the size, shape, number and disposition of parts and in the steps of the method disclosed without departing from the spirit of my invention. I, therefore, wish my description and drawing to be taken as, in a broad sense, illustrative or diagrammatic, rather than as limiting me to my precise showing.

When the device is to be used, it is ordinarily installed in a tank and if the tank is to be filled, the plug 19 is removed. The plug 42 is also removed. A supply hose is secured to the fitting 34. The connection will ordinarily include a member for contacting the part 41 and depressing it to open the valve against the action of the spring 40. Liquid is then caused to flow in through the tube 11 and into the tank. The member 16 acts as a fixed level gauge. At the start of the filling operation only vapor will issue along the pipe 16 and through the opening 17. When the liquid level arises sufficiently liquid enter the pipe 16 and is discharged through the space 17. The operator then knows that his tank is as full as it should be. He stops the introduction of liquid, closes the plug 19 and releases his filling hose and replaces the plug 42.

Filling may take place while the apparatus is in use; that is to say, when the valve 24 is unseated and gas is passing through the system. Filling may also, of course, take place when the valve 24 is closed and when gas is not passing through the system. The effect of the mechanism shown is to provide positive means for preventing liquid or liquid particles from being mixed with the gas as it moves to the point of use. Should this occur it might cause damage to the apparatus such as interfering with the operation of a pressure regulator or putting out the light in a burner or otherwise causing unsatisfactory operation. The pipe 11 thus keeps liquid out of the annular outlet passage 7 and the outlet passage 21. The presence of the pipe 11 in the passage 7 also insures the preservation of an adequate area within the total housing which is not filled with incoming liquid during loading or filling. It is important to preserve an adequate area for effective operation of the safety valve or pressure release. In systems of the past where the entire housing is full or substantially full of liquid during filling an inadequate area remains during filling and, therefore, operation of the pressure release or safety valve is prevented or hindered. The presence of the pipe 11 insures the retention of a satisfactory area for the safety valve at all times.

I claim:

1. In combination in a fluid filling and service assembly, a hollow housing, an internal partition formed in said housing, a perforation therethrough, a filler tube positioned in said perforation and extending out of said housing, a filler valve positioned in said housing on the side of said partition opposite to said tube, yielding means normally holding said valve closed, a passage-way formed in said housing separate from its hollow interior, a tube positioned in said passage-way and extending in the same direction as said filler tube and having its outermost end less distant from said housing than the outermost end of said filler tube, said passage communicating with the exterior of said housing and a valve removably positioned in said passage.

2. In combination in a fluid filling and service assembly, a hollow housing, an internal partition formed in said housing, a perforation therethrough, a filler tube positioned in said perforation and extending out of said housing, a filler valve positioned in said housing on the side of said partition opposite to said tube, a filler valve seat positioned in said housing, yielding means normally holding said valve closed upon said seat, said valve having a stem projecting outward beyond said seat and adapted to be contacted to urge the valve from the seat, a passage-way formed in said housing separate from its hollow interior, a tube positioned in said passage-way and extending in the same direction as said filler tube and having its outermost end less distant from said housing than the outermost end of said filler tube, said passage communicating with the exterior of said housing and a valve removably positioned in said passage.

3. In combination in a fluid filling and service assembly, a hollow housing, an internal partition, formed in said housing, a perforation therethrough, a filler tube positioned in said perforation and extending out of said housing, a filler valve positioned in said housing on the side of said partition opposite to said tube, an opening in the wall of said housing communicating with the space below said partition and outside of said tube, a removable plug positioned in said opening, said plug being perforated, there being a quantity of fusible metal positioned in said perforation and normally filling it, a passage-way formed in said housing separate from its hollow interior, a tube positioned in said passage-way and extending in the same direction as said filler tube and having its outermost end less distant from said housing than the outermost end of said filler tube, said passage communicating with the exterior of said housing and a valve removably positioned in said passage.

4. In combination in a fluid filling and service assembly, a hollow housing, an internal partition formed in said housing, a perforation therethrough, a filler tube positioned in said perforation and extending out of said housing, a filler valve positioned in said housing on the side of said partition opposite to said tube, an opening in the wall of said housing communicating with the space below said partition and outside of said tube, a removable plug positioned in said opening, said plug being perforated, there being a quantity of fusible metal positioned in said perforation and normally filling it, a passage-way formed in said housing separate from its hollow interior, a tube positioned in said passage-way and extending in the same direction as said filler tube and having its outermost end less distant from said housing than the outermost end of said filler tube, said passage communicating with the exterior of said housing and a valve removably positioned in said passage, means defining a service outlet from the space below said partition and outside of said filler tube.

5. In combination in a fluid filling and service assembly, a hollow housing, an internal partition formed in said housing, a perforation therethrough, a filler tube positioned in said perforation and extending out of said housing, a filler valve positioned in said housing on the side of said partition, a passage-way formed in said housing separate from its hollow interior, a tube positioned in said passage-way and extending in the same direction as said filler tube and having its outermost end less distant from said housing than the outermost end of said filler tube, said passage communicating with the exterior of said housing and a valve removably positioned in said passage, and a pressure release valve, a housing portion therefor, and a passage leading from the interior of said main housing below said partition and in communication with said pressure release valve.

6. In combination in a fluid filling and service assembly, a hollow housing, an internal partition formed in said housing, a perforation therethrough, a filler tube positioned in said perforation and extending out of said housing, a filler valve positioned in said housing on the side of said partition opposite to said tube, yielding means normally holding said valve closed, a passage-way formed in said housing separate from its hollow interior, a tube positioned in said passage-way and extending in the same direction as said filler tube and having its outermost end less distant from said housing than the outermost end of said filler tube, said passage communicating with the exterior of said housing and a valve removably positioned in said passage, means defining a service outlet from the space below said partition and outside of said filler tube, an excess flow check valve positioned in said service outlet, a service valve positioned in the line of the service outlet, and means for opening and closing it, and a pressure release valve, a housing portion therefor, and a passage leading from the interior of said main housing below said partition and in communication with said pressure release valve.

7. In combination in a fluid filling and service assembly, a hollow housing, an internal partition formed in said housing, a perforation therethrough, a filler tube positioned in said perforation and extending out of said housing, a filler valve positioned in said housing on the side of said partition opposite to said tube, an opening in the wall of said housing communicating with the space below said partition and outside of said tube a removable plug positioned in said opening, said plug being perforated, there being a quantity of fusible metal positioned in said perforation and normally filling it, a passage-way formed in said housing separate from its hollow interior, a tube positioned in said passage-way and extending in the same direction as said filler tube and having its outermost end less distant from said housing than the outermost end of said filler tube, said passage communicating with the exterior of said housing and a valve removably positioned in said passage, means defining a service outlet from the space below said partition and outside of said filler tube, an excess flow check valve positioned in said service outlet, a service valve positioned in the line of the service outlet, and means for opening and closing it, and a pressure release valve, a housing portion therefor, and a passage leading from the interior of said main housing below said partition and in communication with said pressure release valve.

8. In combination in a fluid filling and service assembly, a hollow housing, an internal partition formed in said housing, a perforation therethrough, a filler tube positioned in said perforation and extending out of said housing, a filler valve positioned in said housing on the side of said partition opposite to said tube, a filler valve seat in said housing, yielding means normally holding said valve closed upon said seat, said valve having a stem projecting outward beyond said seat and adapted to be contacted to urge the valve from the seat, an opening in the wall of said housing communicating with the space below said partition and outside of said tube, a removable plug positioned in said opening, said plug being perforated, there being a quantity of fusible metal positioned in said perforation and normally filling it, a passage-way formed in said housing separate from its hollow interior, a tube positioned in said passage-way and extending in the same direction as said filler tube and having its outermost end less distant from said housing than the outermost end of said filler tube, said passage communicating with the exterior of said housing and a valve removably positioned in said passage, means defining a service outlet from the space below said partition and outside of said filler tube, an excess flow check valve positioned in said service outlet, a service valve positioned in the line of the service outlet, and means for opening and closing it, and a pressure release valve, a housing portion therefor, and a passage leading from the interior of said main housing below said partition and in communication with said pressure release valve.

9. In combination in a fluid-filling and service connection, a main hollow housing, a perforated partition thereacross, a filler tube connected to said perforation and being of less diameter than the hollow within said housing in which the tube is positioned, and a plurality of passages formed in said housing below said partition and communicating with the interior of said housing and cut off from the interior of said filler tube, a plurality of enlargements formed integrally with said main housing, and a pressure release valve positioned in one of said enlargements, a service outlet connection formed in another of said enlargements, an excess flow check valve positioned in said service connection, and a service valve positioned in a third of said enlargements, each of said enlargements being hollow and being connected by means of one of said passages to the interior of said main housing exclusive of the interior of said filler tube, and a conduit from said service valve housing to said service outlet, and an inlet opening formed in said housing above said partition, a valve and a valve seat in said inlet opening, and yielding means tending normally to seat said valve, and an outwardly directed projection attached to said valve and adapted to be contacted to open the valve, and a removable cap normally positioned to close the filling opening.

10. A fitting adapted to be mounted in sealed relation with respect to an opening in a liquefied petroleum gas storage tank, said fitting comprising a hollow body having a horizontally disposed partition therein dividing the body into two chambers, means for withdrawing gas from the tank through one of the chambers, means for introducing a replenishing supply of gas into the tank through the other of said chambers including an element directing said replenishing supply downwardly towards the tank before said supply is free to enter the first chamber, and means for indicating when the liquefied gas reaches a predetermined level during filling operations disposed at a point out of contact with said directed gas.

11. A fitting adapted to be mounted in sealed relation with respect to an opening in a liquefied petroleum gas storage tank, said fitting comprising a body having spaced bores divided by a partition therein to provide two chambers, means for withdrawing gas from the tank through one of the chambers including an excess flow check valve mounted in the body, means for introducing a replenishing supply of gas into the tank through the other of said chambers including an element directing said replenishing supply into the tank before said supply is free to enter the first chamber, vent means for indicating when the liquefied gas reaches a predetermined level during filling operations including a dip tube leading to a passageway in said body which passageway terminates in a valve seat, and valve means carried by the body to cooperate with said valve seat.

12. A fitting adapted to be mounted in sealed relation with respect to an opening in a liquefied petroleum gas storage tank, said fitting comprising a body having vertically spaced compartments therein separated by a partition, service line means for withdrawing gas from the tank through one of the compartments including a shutoff valve seat integral with the body and a manual shutoff valve carried by the body to cooperate with said seat, an excess flow check valve mounted in the body to obstruct the flow of gas through the service line means when a predetermined rate of flow is exceeded, filler means for introducing a replenishing supply of gas into the tank through the other of said compartments including an element directing said replenishing supply into the tank before said supply is free to enter the first compartment, said filler means including an automatic valve preventing outward flow of the gas.

13. A fitting adapted to be mounted in sealed relation with respect to an opening in a liquefied petroleum gas storage tank, said fitting comprising a body having two compartments machined therein and divided by a partition, service line means for withdrawing gas from the tank through one of the compartments including a shutoff valve seat integral with the body and a manual shutoff valve carried by the body to cooperate with said seat, an excess flow check valve mounted in the body to obstruct the flow of gas through said service line means when a predetermined rate of flow is exceeded, filler means for introducing a replenishing supply of gas into the tank through the other of said compartments including an element directing said replenishing supply into the tank before said supply is free to enter the first compartment, said filler means including an automatic valve preventing outward flow of the gas, a passageway from one of the compartments in open communication with the tank and terminating outwardly in a valve seat, safety valve means carried by said body to cooperate with said valve seat, and means carried by the body for indicating when a liquefied gas reaches a predetermined level during filling operations.

14. A fitting for liquefied petroleum gas container comprising a unitary body having spaced compartments therein separated by a threaded opening and spaced passageways for filling, venting and dispensing operations, two of said passageways being defined by a tube received in said opening, means for filling the container through one of the passageways comprising a safety check valve and an excess flow check valve, said valves opening in the direction of flow of filling fluid, means for venting the container comprising a valve and a tube secured to the body to extend into the tank to the maximum fill level, means for dispensing fluid from the container comprising another of said passages, a shutoff valve and an excess flow check valve, a safety relief valve in said body in open communication with the container.

15. A fitting for liquefied petroleum gas systems comprising a unitary body having axially spaced bores therein separated by a threaded opening in the end wall of one of the bores, a tube threaded into said opening and disposed concentrically in one of said bores to divide same into inner and outer passageways, a safety valve comprising a fusible metal and a pressure safety relief valve in open communication with the outer passageway, a filler means communicating with one of said passageways including an excess flow check valve and a lateral boss upon the body in which a shutoff valve is mounted, and vapor vent means for indicating when a predetermined level is reached during filling operations including a dip tube mounted upon the body and including a passage in the body terminating in a manual control bleed valve.

16. A fitting adapted to be mounted in sealed relation with respect to an opening in a liquefied petroleum gas storage tank, said fitting comprising a hollow body having a horizontally disposed body portion therein dividing the body into vertically spaced chambers, means for withdrawing gas from the tank through one of the chambers including a passageway having a shutoff valve therein, means for introducing a replenishing supply of gas into the tank through the other of said chambers including an automatic valve preventing reverse flow of fluid when released so to do and an element directing said replenishing supply downwardly towards the tank before said supply is free to enter the first chamber, a passageway from one of the compartments in open communication with the tank and including a safety relief valve carried by said body, and means for indicating when the liquid gas reaches a predetermined level during filling operations.

17. A T-fitting comprising a body having a central portion with laterally extending bosses thereon, a safety valve in one boss including a valve seat integral with the body, a service line connection machined in another boss including an excess flow check valve, a manual shutoff valve received in another boss including a valve integral with the body, a passage through the body from the shutoff valve to the service line connections, means in said body for connecting said valve ports in open communication with the interior of the tank, means for introducing liquefied gas into the tank at a point spaced from the tank including a valved compartment and tube extending into the tank, and means for indicating when liquefied gas reaches a predetermined level during filling operations including a bleed opening connected through the body to an eduction opening upon a tube extending into the tank to a predetermined level.

18. A fitting adapted to be mounted in sealed relation with respect to an opening in a liquefied petroleum gas storage tank, said fitting comprising a hollow body having a horizontally disposed body portion therein dividing the body into vertically spaced chambers, means for withdrawing gas from the tank through one of the chambers including a passageway having a manual shutoff valve and an excess flow check valve therein, means for introducing a replenishing supply of gas into the tank through the other of said chambers including an automatic valve obstructing reverse flow of fluid and an element directing said replenishing supply downwardly towards the tank before said supply is free to enter the first chamber, a passageway from one of the compartments in open communication with the tank and terminating in a valve seat, safety valve means carried by said body to cooperate with said valve seat, and means for indicating when the liquid gas reaches a predetermined level during filling operations.

19. A fitting adapted to be mounted in sealed relation with respect to an opening in a liquefied petroleum gas storage tank, said fitting comprising a unitary body having a recess communicating with the tank, a pressure relief valve in the body including a valve seat formed integrally with the body around a port which is in communication with said recess, means for educting fluid from the container including a manual shutoff valve and an excess flow check valve mounted in said body in communication with the tank, filler means for introducing a replenishing supply of gas into the tank including an element providing a wall between the filler means and the educting means for directing said supply downwardly towards the tank before said supply is free to enter the educting means, and means carried by the body for indicating when the gas reaches a predetermined level during filling operations including a valve and tube extending to a predetermined depth in the tank when the fitting is secured in place.

20. A fitting adapted to be mounted in sealed relation with respect to an opening in a liquefied petroleum gas storage tank, said fitting comprising a body having substantially axially aligned bores separated by a partition which has an opening therethrough, a tube extending through one of the bores and received in supported relation in said opening in communication with other of said bores and to provide separate passages through said one bore that are in communication with the interior of the tank, a gas eduction conduit and control valve connected to one of said passages, means for filling the tank through the other of said passages, and a safety relief valve in communication with one of said passages in constant communication with the interior of the tank.

21. A fitting for liquefied petroleum gas equipment comprising a body having a boss with a bore therein and adapted to be mounted in sealed relation with respect to an opening in a liquefied petroleum gas tank with the bore in communication therewith, means for filling the tank including a passage in the body, means for educting gas from the tank including a passage in the body, means for preventing the replenishing gas from entering the eduction passage before entering the container including a tube disposed in and extending beyond the bore, said tube being connected to one of said passages and the other passage being in communication with the bore, a pair of bosses disposed on opposite sides of said first boss and having bores therein, one bore in communication with the first bore and having a valve seat integrally formed in the body, a pressure relief valve cooperating with the valve seat and means upon the other of said pair of bosses for connecting the eduction passage to a service line including a valve actuated manually for closing said eduction passage while the service line is disconnected.

22. A fitting for liquefied petroleum gas equipment comprising a body having a plurality of bosses thereon with their axes lying in the same plane, one of said bosses having a bore therein and being adapted to be mounted in sealed relationship with respect to an opening in a liquefied petroleum gas tank with the bore in communication therewith, another of said bosses having a bore therein receiving a safety valve mechanism and terminating in a valve seat in communication with the first bore, another of said bosses having a bore therein receiving a filling valve mechanism, and another of said bosses being so constructed and arranged as to receive a service line connection and including a valve mechanism operated manually.

23. A fitting for liquefied petroleum gas equipment comprising a body having a plurality of bosses thereon with their axes lying in the same plane and two of the bosses disposed substantially in axial alignment, one of the plurality of bosses having a bore therein and adapted to be mounted in sealed relationship with respect to a liquefied petroleum gas tank, one of said two bosses having a compartment therein receiving a safety valve mechanism cooperating with a valve seat which is in communication with said bore, and the other of said two bosses having a passage therethrough and adapted to receive a service line connection, means for filling the tank through another boss including a filler valve mechanism, and means for venting the tank through a valve controlled opening.

24. In a fitting for liquefied petroleum gas dispensing equipment having an integral body member provided with a chamber and adapted to be secured to a tank in sealed relation with the chamber in open communication with the interior of the tank, the combination of a gas dispensing conduit through the wall of the body member adapted to receive a manual shut off valve, a safety vent conduit opening inwardly into the chamber, a safety valve mechanism carried by the body member to control the flow of gas through said safety vent conduit, conduit means communicating with the interior of the tank for replenishing the tank including an element directing a replenishing supply of gas downwardly toward the tank before it is free to enter said dispensing conduit, said conduit means including an excess flow check valve and an inlet opening, a valve seat in said inlet opening, a valve member cooperating with the valve seat and opening in the direction of flow of replenishing liquid, an outwardly extending projection on the valve member adapted to be contacted to open the valve by positive displacement.

25. In a fitting for liquefied petroleum gas dispensing equipment having a body member provided with a recess therein and adapted to be mounted in sealed relation with respect to an opening in a tank, said recess being in open communication with the interior of the tank, the combination of a conduit means opening into said recess and terminating in a valve seat adapted to be closed by a safety valve mechanism, a second conduit means opening into said recess and adapted to receive a manual shut off valve and an excess flow check valve, a third conduit means communicating with the tank for replenishing the tank and including an element on said body for directing a replenishing supply of liquefied petroleum gas downwardly towards the tank before said supply is free to enter said first two conduit means, said third conduit means having an inlet compartment adapted to receive a safety check valve, and means out of contact with said directed gas for indicating when a predetermined level is reached in the tank during filling operations.

SAVIN L. SUNDSTROM.